(12) United States Patent
Rasmussen et al.

(10) Patent No.: US 6,247,714 B1
(45) Date of Patent: *Jun. 19, 2001

(54) RECUMBENT CYCLE WITH IMPROVED SUSPENSION

(75) Inventors: C. Martin Rasmussen, Fruit Heights; Larry L. Howell, Orem, both of UT (US); Chris Johnson, San Diego, CA (US); Kirk Johnson, Puyallup, WA (US); Kyle Hansen; Toni Cedeño, both of Provo, UT (US); Doug Hayes, Ames, IA (US); Jim Arnold, Cocoa, FL (US)

(73) Assignee: Happijac Company, Kaysville, UT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/056,407

(22) Filed: Apr. 7, 1998

Related U.S. Application Data

(60) Provisional application No. 60/041,829, filed on Apr. 9, 1997.

(51) Int. Cl.[7] ...................................................... B62K 5/00
(52) U.S. Cl. .......................... 280/231; 280/282; 280/283; 280/288.1
(58) Field of Search .................................. 280/231, 282, 280/281.1, 283, 288.1, 275, 274, 267

(56) References Cited

U.S. PATENT DOCUMENTS

| | | | |
|---|---|---|---|
| 443,818 | * 12/1890 | Bullard | 280/261 |
| 591,306 | * 10/1897 | Tolson | 280/283 |
| 3,664,684 | 5/1972 | Long | 280/231 |
| 4,431,205 | * 2/1984 | Speicher et al. | 280/282 |
| 4,746,135 | * 5/1988 | Oh | 280/262 |
| 4,786,070 | 11/1988 | Adee | 280/281 |
| 5,071,150 | * 12/1991 | Conrad | 280/264 |
| 5,326,121 | 7/1994 | Fisher | 280/282 |
| 5,342,074 | 8/1994 | Amdahl et al. | 280/209 |
| 5,484,152 | * 1/1996 | Nunes et al. | 280/282 |
| 5,544,906 | 8/1996 | Clapper | 280/288.1 |
| 5,568,935 | * 10/1996 | Mason | 280/282 |

* cited by examiner

Primary Examiner—J. J. Swann
Assistant Examiner—David R. Dunn
(74) Attorney, Agent, or Firm—Workman, Nydegger & Seeley

(57) ABSTRACT

A recumbent cycling apparatus is provided that includes a frame structure, wheels rotatably attached to supporting the frame structure, and a central frame element configured to absorb and reduce the forces transmitted through the frame structure to a user. The frame structure has a front frame section and a back frame section that are substantially parallel to the ground. The central frame element is a curved elongated member composed of chromoly steel that is attached to the front frame section and the back frame section and extends therebetween. The central frame element is configured to allow the front frame section and the back frame section to move substantially independently in response forces exerted on the wheels. The central frame element is disposed in a substantially vertical plane above the back frame section and the front frame section and is substantially perpendicular thereto. A pair of recumbent seats are mounted on the back frame section in a side-by-side relationship. The cycling apparatus also has a control assembly configured to turn at least one of said plurality of wheels and a pedal-powered drive assembly to propel the cycling apparatus.

28 Claims, 4 Drawing Sheets

RECUMBENT CYCLE WITH IMPROVED SUSPENSION

RELATED APPLICATIONS

The benefit of the earlier filing date of a U.S. Provisional Patent Application Serial No. 60/041,829, filed Apr. 9, 1997, is claimed for this application under 35 U.S.C. §119(e).

BACKGROUND OF THE INVENTION

1. The Field of the Invention

The present invention is related to bicycles and other pedal-powered cycling apparatus, and more particularly, is related to a recumbent style side-by-side pedal-powered cycling apparatus capable of carrying more than one rider.

2. Present State of the Art

Bicycles and other pedal-powered cycles are well-known. Pedal-powered cycles, particularly two and three-wheeled cycling apparatus, provide efficient and economical means of transport for many people all over the world. Cycling, on whatever form of pedal-powered cycle, is also enjoyed as a leisurely recreational activity by many adults. Pedal-powered cycles are also an excellent form of exercise, and in particular are excellent for aerobic and strengthening exercises. Sport cycling includes activities ranging from relatively low-intensity bicycle touring to high-intensity competitive bicycle speed and/or distance racing.

Although cycling is very popular, many people do not participate in activities involving a pedal-powered cycle because current designs for bicycles or other cycles are not compatible with their skill and/or strength levels or are not comfortable for them to use. Small children commonly ride three and four-wheeled cycles prior to moving on to a two wheeled bicycle. These alternate pedal-operated cycles have a frame that is oriented in a horizontal plane that is substantially parallel to the ground with wheels in the same or a parallel plane and a seat positioned on top of the frame. This alternate configuration of pedal-powered cycles allows children to develop the skills and/or balance required to ride a traditional bicycle. Most children eventually graduate to bicycles having a frame vertically oriented with the wheels in the same plane and a seat positioned on top of the frame.

Besides requiring a user to be able to balance the bicycle, conventional bicycle designs also require the user to step over or climb upon the frame to either straddle or sit on a seat mounted atop the bicycle frame. The acts of mounting and/or sitting upon a bicycle are difficult or even impossible to perform for many persons, particularly, older persons or persons with some type of a disability. The sitting position required while using a conventional bicycle may be uncomfortable or even painful for some users, particularly those with back or neck problems. Further, while seemingly a minor inconvenience, having the entire weight of the rider primarily concentrated on a portion of the posterior which contacts the seat on a traditional bicycle can result in an unaccustomed discomfort and soreness that may discourage and even dissuade the occasional recreational user.

Once on the bicycle, the user of the bicycle must then be able to balance his or her weight upon the bicycle to maintain an upright position. At the same time, the user must operate the pedals with his or her legs to propel the bicycle forward while steering with their hands. Thus, persons who desire to cycle must generally possess sufficient body strength, flexibility, and coordination to perform the required functions as well as attain and maintain the required body positioning for the desired period of cycling time. For many persons, including older persons or persons with disabilities, however, coordinating the balancing, pedaling, and steering activities is a problem. The rider may become fatigued due to these difficulties and/or simply the physical exertion prevents them from enjoying cycling.

A number of different seating configurations in pedal-powered cycles have been developed to provide relief from the problems associated with the typical upright position required on conventional bicycles. One such seating configuration is the recumbent seat which enables a rider to sit in a relaxed reclined position with support for the back, thereby reducing lower neck and back strain, as well as general arm and leg fatigue. The frame on a cycling apparatus that utilizes a recumbent seat is elongated and allows the seat to be mounted on the frame such that the rider is sitting in a seat mounted on the frame. On a recumbent bicycle, instead of the legs of the user being below the seat and body, the legs of the user typically extend forward to the pedals. In other words, instead of the pedals being below the rider as on a traditional bicycle, the pedals are mounted in front of the rider.

In addition to those who choose a recumbent bicycle because the sitting position on a traditional bicycle is uncomfortable, a recumbent bicycle is often chosen by those with bad knees or who are recovering from knee surgery because the positioning of the pedals in front of the rider puts less stress on the knees. The advantages of the recumbent seat include eliminating the user having to lean forward to grasp the handle bars, reducing the balancing requirements, and eliminating the soreness resulting from the pressure caused by the seat on a traditional bicycle.

Often it is desirable for a pedal-powered cycle to be capable of carrying more than one person. This may be preferable when companionship is desired during exercise, for example, or when a child or disabled person is involved. People enjoy being able to interact socially with each other and, in particular, to see each other and even touch each other and to conduct conversations while exercising or during other activities such as traveling together. Traditional bicycling does not lend itself to this type of socializing because bicycles are primarily designed for one person. Where conversation is desired, not only must each person must be able to separately operate a bicycle, but the difficult and at times dangerous task of attaining and maintaining a position relative to each other that permits conversation must be attempted. Even if the riders are successful, often only brief snatches of conversation are able to occur.

One type of pedal-powered cycling apparatus that is available and is configured to have more than one rider is a tandem bicycle. On a tandem bicycle, one rider sits in front of another rider, with each having pedals for providing power, and the front user steers the bicycle. There are, however, several drawbacks associated with tandem bicycles. For example, a tandem bicycle typically requires the two users to ride one behind the other and, thus, also does not facilitate social interaction. Further, the rider that is towards the back of the bicycle has limited visibility because the front rider blocks their view. As a result, the rider towards the back of the tandem bicycle cannot see where the bicycle is heading and must either try to look around the front rider or look only to the side. This may cause the back rider to lose interest in the activity.

Tandem bicycles, however, like traditional bicycles, require the user to be balanced while riding. While a conventional bicycle requires a rider to remain balanced, a tandem bicycle complicates balancing because two independent riders must coordinate their movements in order to keep the vehicle balanced. It may be preferable in some instances to have a pedal-powered cycling apparatus that is more stable and does not require riders to pay constant attention to their balance.

One attempt to provide a pedal-powered cycling apparatus for more than one rider that provides better balance and stability than a tandem bicycle are side-by-side bicycles. Some of the side-by-side bicycles are actually two standard upright bicycles which have been secured together side-by-side by a number of cross-braces interconnected therebetween, in order to provide a complete 4-wheeled cycling apparatus. The four points of contact with the road results in the cycling apparatus being better balanced and allows the user to worry less about balancing the bike.

A number of drawbacks exist with upright side-by-side cycling apparatus. While the balance and stability of this type of cycling apparatus is much greater than a traditional bicycle, the center of gravity for these vehicles is rather high since the riders sit upright. Therefore, greater stresses are placed on the cross-bracing and the vehicle may be prone to tipping over. In addition, the two upright bicycles like the tandem bicycle, while being capable of carrying more than one rider, still have the other shortcomings of a conventional bicycle. For example, the problems with the upright sitting position, straddling the frame, mounting the bicycle, and discomfort caused by the seat are still present.

Dual recumbent cycling apparatus are available that have a pair of recumbent bicycles interconnected in a side-by-side relationship. These dual recumbent bicycles have a frame that is much like a platform and is oriented in a horizontal plane. The dual recumbent apparatus is supported by wheels that are in the same or a parallel plane. The configuration of the frame structures of available dual recumbent bicycles have very little flex and provide almost no cushioning to the riders. Consequently, these dual recumbent cycles are stiff and have a rough and jarring ride that is fatiguing to the users. As the dual recumbent cycling apparatus hits a bump, the force is transmitted through the frame and seat directly to the rider with vary little absorption or dampening.

One approach to improving the ride of a dual recumbent cycle is to add a shock absorbing or damping system like those used in motorized vehicles. These shock absorbing systems, however, are expensive and add a significant amount of undesirable weight to the apparatus.

Therefore, a need exists for a pedal-powered cycling apparatus that is capable of carrying two riders, is stably balanced, is easy to mount and operate, permits the riders to sit side-by-side in a comfortable position, and provides an improved ride which reduces the amount of jarring and fatigue upon the rider.

SUMMARY AND OBJECTS OF THE INVENTION

It is, therefore, an object of the present invention to provide a dual recumbent pedal-operated cycling apparatus with a frame that is configured to reduce the amount of shock and bumps felt by the rider, thereby reducing rider fatigue.

Another object of the present invention is to provide a frame for a recumbent cycling apparatus that is configured to absorb and dampen the forces transmitted to the rider.

Another object of the present invention is to provide a frame that is configured to be able to absorb the bumps and shock to improve the comfort of the ride without adding weight to the cycling apparatus.

Another object of the present inventions is to provide a pedal-powered cycling apparatus that is stably balanced and easy to mount. In particular, it is an object that a person is able to sit upon the apparatus without having to step or climb over or otherwise straddle any portion of the frame element.

It is a further object of the present invention to provide a pedal-powered cycling apparatus that can be used by one person alone or by two persons together and that permits two persons to sit in a comfortable recumbent position in a side-by-side manner in close proximity to one another while cycling.

Another object of the present invention is to provide a pedal-powered cycling apparatus with a wide range of gear ratios that is easy and comfortable to pedal and steer from the recumbent position in varied terrain and circumstances.

Additional objects and advantages of the invention will be set forth in the description which follows, and in part will be obvious from the description, or maybe learned by the practice of the invention. The objects and advantages of the invention maybe realized and obtained by means of the instruments and combinations particularly pointed out in the appended claims.

To achieve the foregoing objects, and in accordance with the invention as embodied and broadly described herein a recumbent cycling apparatus is provided that includes a frame structure, wheels, and suspension means for absorbing and reducing the forces transmitted through said frame structure to a user. The frame structure has a front frame section and a back frame section that are substantially parallel to the ground. The wheels are rotatably attached to the frame structure to support the frame structure. The suspension means comprises an elongated central frame element that is attached to the front frame section and the back frame section and extends therebetween. The central frame element is configured to allow the front frame section and the back frame section to move substantially independently in response forces exerted on the wheels. The central frame element has a substantially curved profile and is disposed in a substantially vertical plane above the back frame section and the front frame section and is substantially perpendicular to the front frame section and the back frame section. The central frame element is substantially comprised of a material selected from a group comprising chromoly steel, aluminum, titanium, and graphite. A recumbent seat is mounted on the back frame section. The recumbent cycling apparatus also has a steering means for turning at least one of the plurality of wheels and a pedal-powered drive means for powering the cycling apparatus.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention is directed to a side-by-side dual recumbent style peda-powered cycling apparatus. The frame structure of the dual recumbent cycling apparatus is configured to provide an improved ride and reduce the jarring and fatigue of the rider by utilizing an elongated member that acts as a suspension system that reduces and dampens forces acting on the frame.

Figure 1:
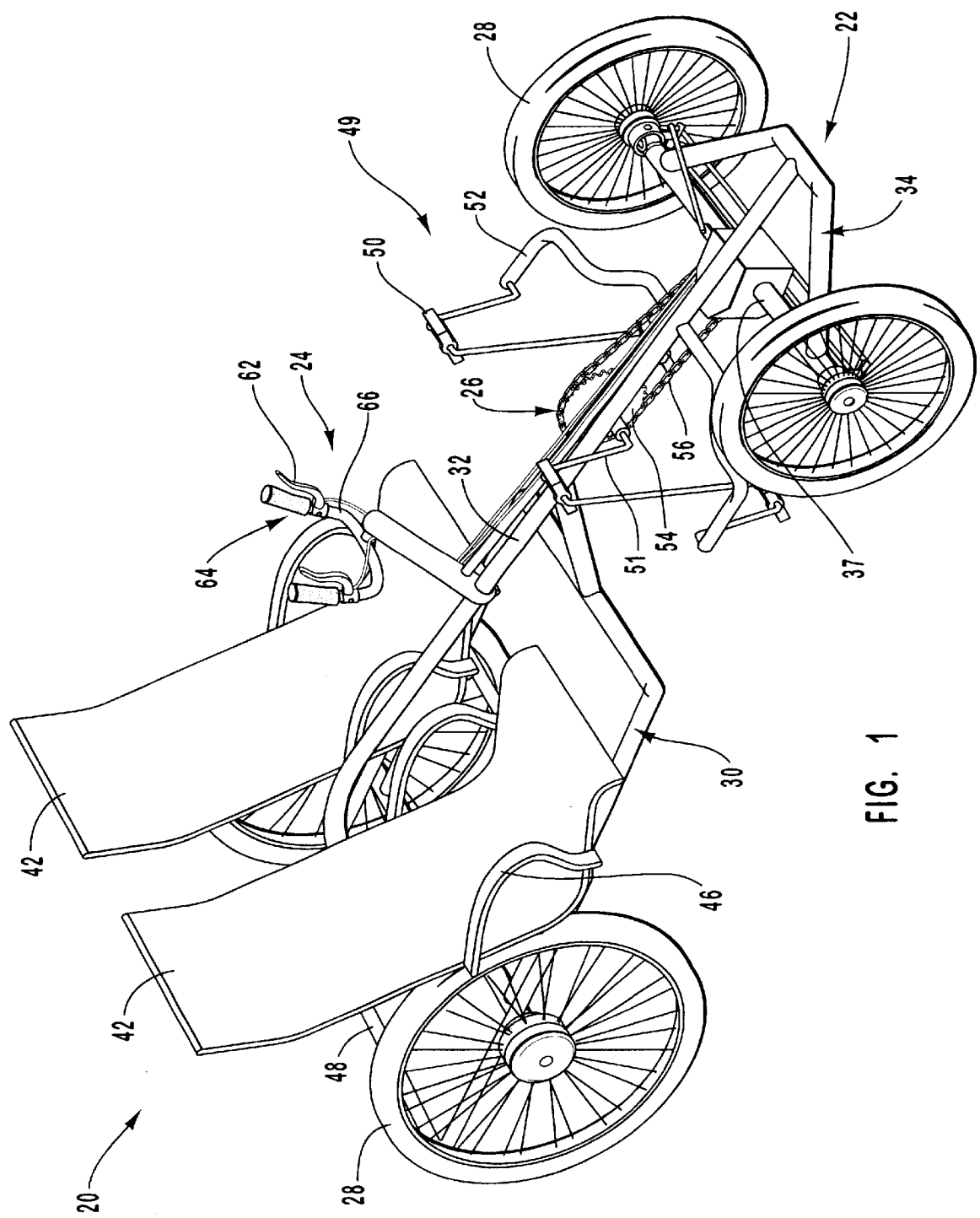
FIG. 1 is a perspective view of one embodiment of a dual recumbent cycling apparatus.

FIG. 1 illustrates one embodiment of a side-by-side dual recumbent style pedal-powered cycling apparatus generally at 20. Cycling apparatus 20 comprises a frame structure 22, a control assembly 24, and drive assembly 26. Frame structure 22 is supported by wheels 28. As illustrated, wheels at the front of cycling apparatus 20 are slightly smaller than the back wheels. Wheels 28 could instead be the same size. While cycling apparatus 20 is depicted in FIG. 1 as a four-wheeled embodiment, it can be appreciated that various other numbers of wheels 28 may be utilized. For example, cycling apparatus 20 could have three wheels, two in the back and one in the front, supporting frame structure 22. The four-wheeled embodiment is presently preferred because of the increased stability. Wheels 28 are rotatably attached to frame structure 30 by conventional rotatable connectors, such as by way of example, bearing assemblies.

Hereinafter, the "fronft" of cycling apparatus 20 relates to the portion of cycling apparatus 20 which the rider is facing when seated in the operational position, and the "back" is the general region behind the rider when seated in the operational position.

Frame structure 22 is preferably made of durable and lightweight materials such as chromoly steel, aluminum, titanium or graphite fiber. The individual pieces making up frame structure 22 may have various cross-sectional configurations. Typically, the pieces are tubular and are substantially round. Various other cross-sectional shapes, by way of example and not limitation, such as oval, triangular, or elliptical perform the function thereof with equal effectiveness.

Figure 2:
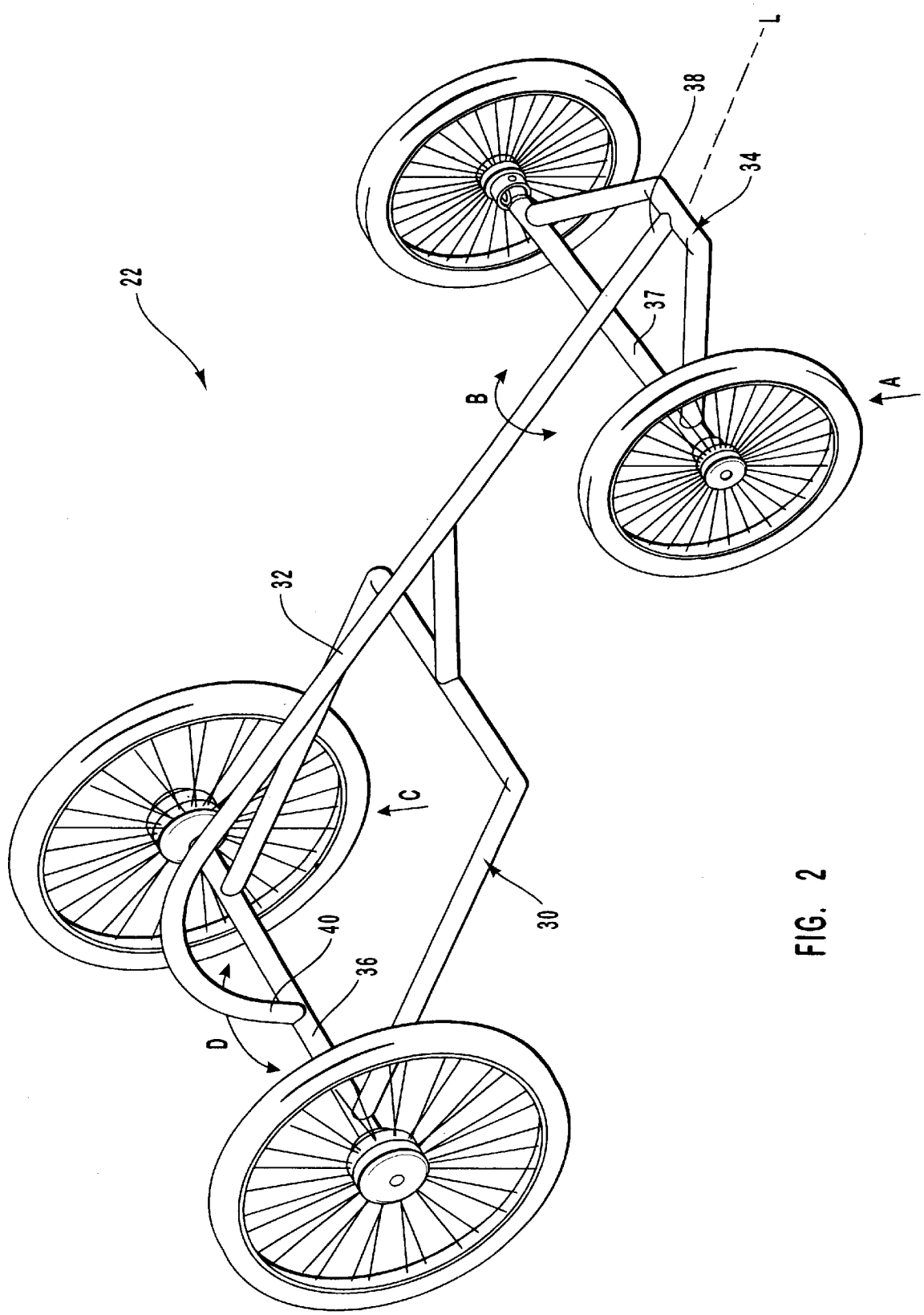
FIG. 2 is a perspective view of the flame structure of FIG. 1.

According to one aspect of the present invention, frame structure 22 comprises a back frame section 30, a central frame element 32, and a front frame section 34. As depicted in FIG. 2, which illustrates one preferred embodiment of frame structure 22 in insolation, one embodiment of back frame section 30 includes a rear axle 36 that is supported by wheels 28 on each side. This embodiment of back frame section 30 is suspended from central frame element 32. Back frame section 30 is depicted as being substantially square. Various other configurations of back frame section 30 are equally effective as long as there are opposing sides for attachment of a seat which is accessible without having to climb over any portion of back frame section 30. Back frame section 30 is substantially planar and is oriented so to be substantially horizontal to the ground.

Figure 4:
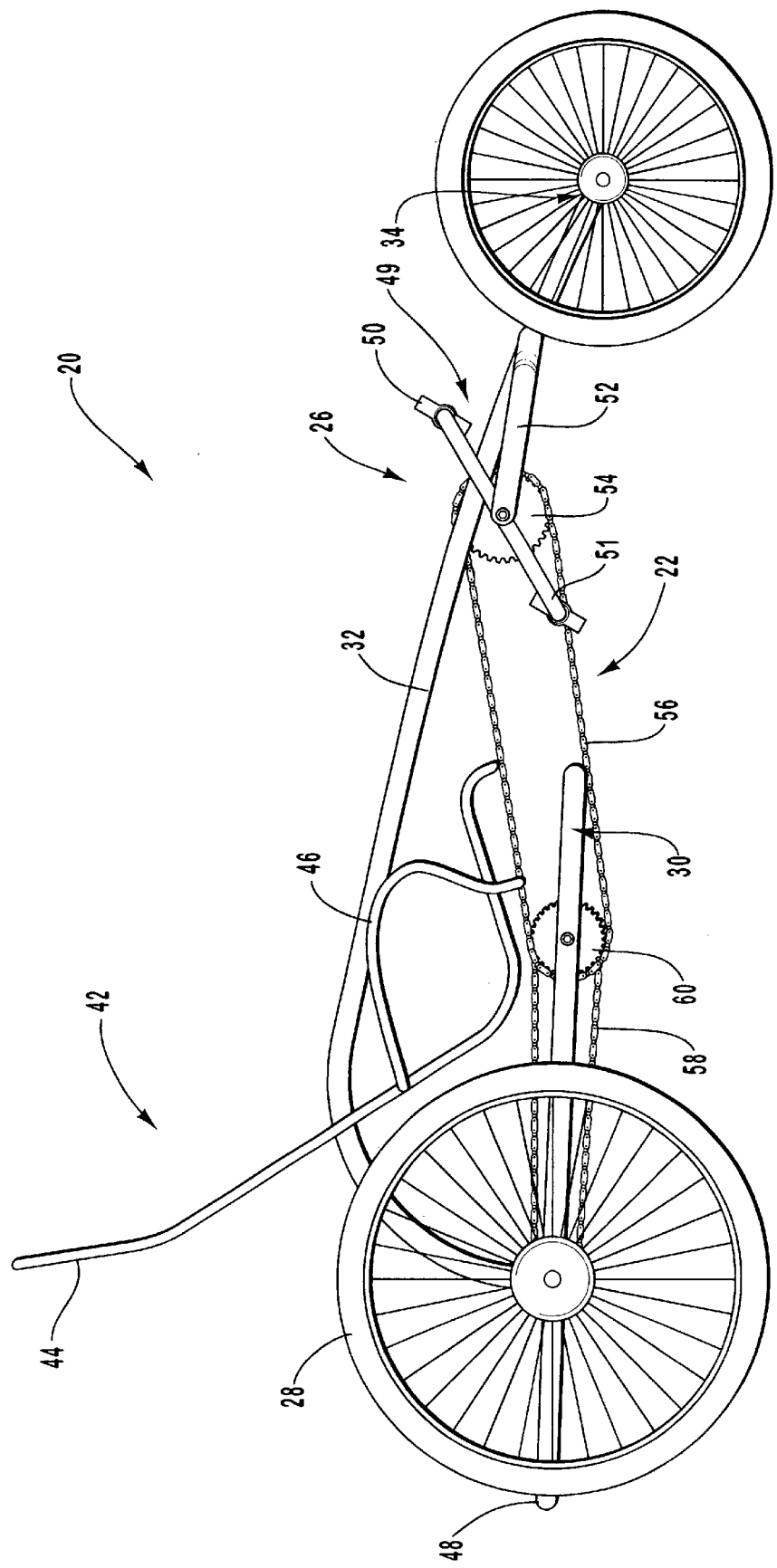
FIG. 4 is an elevation view of an alternate embodiment of a dual recumbent cycling apparatus.

FIG. 4 depicts an alternate embodiment of back frame section 30. In this embodiment, the front portion of back frame section 30 is not attached to central frame element 32. Instead, only rear axle 36 of back frame section 30 is attached to central frame element 32. In this configuration, back frame section 30 has a cantilever-like embodiment which enables central frame element 32 to have an increased amount of flexibility to absorb and dampen the forces transmitted through front frame section 34 and back frame section 30.

One preferred embodiment of front frame section 34 is depicted in FIG. 2. Front frame section 34 is also attached to central frame element 32 and includes a front axle 37 that is supported on each side thereof by wheels 28. In this presently preferred embodiment, front frame section 34 is planar and is also substantially horizontal to the ground. Front frame section 34 is parallel to back frame section 30 and preferably is coplanar. Front frame section 34 may have various other configurations and perform the function thereof equally effectively. An alternate configuration of front frame section 34 is depicted in FIG. 4. In this embodiment, front frame section 34 comprises front axle 37 with central frame element 32 attached directly to front axle 37.

According to one aspect of the present invention, cycling apparatus 20 comprises suspension means for absorbing and reducing the bumps and forces transmitted through frame structure 22 to a rider of cycling apparatus 20. The suspension means is configured to allow front frame section 34 including front axle 37 and said back frame section 30 including rear axle 36 to move relatively independently of each other in response to bumps and forces acting on wheels 28. The configuration of the suspension means allows front frame section 34 and back frame section 30 to rotate about the longitudinal axis of the suspension means relatively independently of each other in response to forces acting on wheels 28.

Structure capable of performing the function of such a suspension means for absorbing and reducing the bumps and forces transmitted through frame structure 22 to the riders of cycling apparatus 20, as shown by way of example and not limitation in FIG. 2, comprises central frame element 32. Central frame element 32 has a forward end 38 and a back end 40. In one embodiment, back end 40 of central frame element 32 is attached to rear axle 36 of back frame section 30. Forward end 38 of central frame element 32 is attached to the forward portion of front frame section 34. Various other sites of attaching central frame element 32 to front frame section 34 and back frame section 30 are available, as previously mentioned. It is preferred, however the distance between the attachment sites be maximized to increase the ability of central frame element 32 to absorb and reduce the bumps and forces transmitted through frame structure 22 to the riders.

As illustrated, central frame element 32 is attached to the front and the back of frame structure 22. In particular, in the presently preferred embodiment illustrated in FIG. 2, central frame element 32 is attached back frame section 30 and front frame section 34 such that it lies in a substantially vertically oriented surface. In this embodiment, central frame element 32 is disposed above front frame section 34 and back frame section 30. Other positions in relation to front frame section 34 and back frame section 30 are equally functional. In one embodiment, central frame element is substantially planar. Central frame element 32 may, however, have a nonplanar configuration, such as an "s-shape" and perform the function thereof with equal effectiveness.

Central frame element 32 of the illustrated embodiment has a curved profile. It can be appreciated that central frame element 32 may have various curvatures and be capable of performing the function thereof equally effectively. By way of example, central frame element 32 may comprise a series of linear portions such as steps or segments. As depicted in the preferred embodiment illustrated in FIG. 2, central frame element 32 is neither parallel nor coplanar with either back frame section 30 or front frame section 34. Central frame element 32 could, however, be portioned such that it extends between back frame section 30 and front frame section 34 and is substantially coplanar with front frame section 34 on back frame section 30 and perform the function thereof. The important thing is that central frame element 32 be positioned such that front frame section 34 and back frame section 30 can move and rotate substantially independently from each other in response to forces acting on one or more wheels 28.

Figure 3:
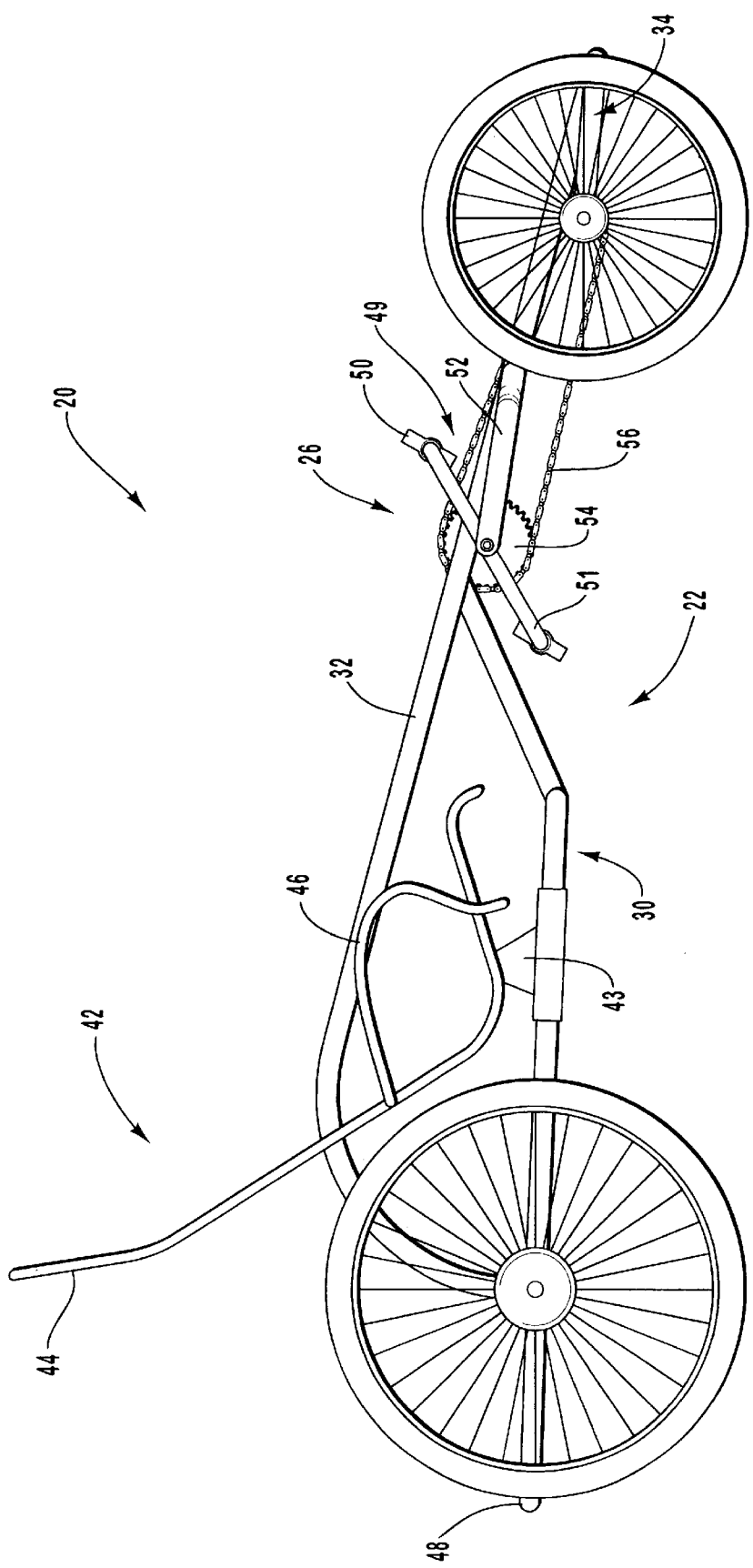
FIG. 3 is an elevation view of the structure of FIG. 1 including one embodiment of a petal-powered drive assembly.

FIG. 3 depicts central frame element 32 as being attached to rear axle 36 of back frame section 30 and the front portion of front frame section 34. It is, however, to be understood that various other connection points to front frame section 34 and back frame section 30 are equally effective. Central frame element 32 could instead be attached to and extend between front axle 37 and rear axle 36 regardless of the configurations of front frame section 34 or back frame section 30. Similarly, while FIG. 3 depicts central frame element 32 as being attached at the center of back frame section 30 and front frame section 34, central frame element 32 may instead be attached more to one side. Likewise, central frame element 32 may be attached to front frame section 34 as depicted in FIG. 2 but back end 40 is attached to one side or the other of back frame section 30.

Most side-by-side dual recumbent cycling apparatus have one substantially rigid planar frame structure which rather than absorbing any of the bumps or forces acting on the wheels merely transmits the forces directly to the rider. These frames are typically a square or rectangular platform that result in a rough and fatiguing ride.

In contrast, the elongated configuration and curvature of central frame element 32 provides an amount of flexibility such that central frame element 32 is capable of flexing from the torsional forces acting on wheels 28. For example, if force A acts on wheel 28 as depicted in FIG. 2, as if wheel 28 hit a hole or rock, central frame element 32 allows front frame section 34 to rotate about central frame element 32 as shown by the arrows B. In other words, central frame element 32 is sufficiently flexible to absorb at least a portion of the torsional forces B created by force A acting on wheels 28. The flexibility of central frame element 32 allows front frame section 34 to rotate in response to force A substantially independent of back frame section 30.

Similarly, if force C acts on a wheel 28 attached to back frame structure 30, central frame element 32 is sufficiently flexible to absorb the torsional forces caused by back frame section 30 rotating about the arrow D. As with the example with front frame section 34, upon experiencing force C, back frame section 30 twists about central frame element 32 substantially independently of front frame section 34. In addition, central frame element 32 is sufficiently long and has a curved configuration that can accommodate some amount of side-to-side movement and/or vertical movement of front frame section 34 relative to back frame section 30.

It will be appreciated that the amount of absorption and dampening or reducing of the forces by central frame element 32 is, in addition to the configuration of central frame element 32, a function of the characteristics of the material comprising central frame element 32. Central frame element 32 may be composed of chromoly steel, aluminum, titanium, or graphite fiber. Preferably central frame element 32 is comprised of a chromoly steel material.

As illustrated in FIGS. 1 and 3, cycling apparatus 20 has one embodiment of two side-by-side seats 42 mounted on back frame section 30. Seats 42 are attached to opposing sides of back frame section 30. Seats 42 are attached to back frame section 30 by an adjustment mechanism 43 (FIG. 3) that allows seats 42 to be individually adjusted on back frame section 30 to accommodate riders having different lengths of legs. Seats 42 allow the rider to sit back and relax and are configured as what are typically known as the "recumbent" position. Seats 42 as depicted have a fairly high back portion 44 to provide back support to the rider. Seats 42 could have a somewhat lower back portion 44 or be configured differently and perform the function thereof equally effectively. For increased comfort, seats 42 also have optional arm rests 46. An optional cargo compartment 48 is located behind seats 42 for carrying items, by way of example and not limitation, such as gear or groceries.

According to another aspect of the present invention, cycling apparatus 20 also comprises a pedal-operated drive means for powering the cycling apparatus 20. Structure capable of performing the function of such a pedal-operated drive means for powering cycling apparatus 20, as shown by way of example and not limitation in FIGS. 1 and 3, comprises drive assembly 26.

Drive assembly 26 includes a pedal assembly 49, a conventional freewheel assembly (not shown), and a conventional geared hub (not shown). Drive assembly 26 further includes a chainring 54 and chain 56. One embodiment of drive assembly 26 is substantially modular. Cycling apparatus 20 can be either front wheel driven or rear wheel driven merely depending on where drive assembly 26 is mounted to frame structure 22. Drive assembly 26 transmits the power provided by a user at pedal assembly 49 to wheels 28. Pedal assembly 49 comprises pedals 50, crank arms 51, and pedal supports 52.

The mechanics of pedal-powered cycles are well known. Generally speaking, pedals 50 are connected to the freewheel assembly which is connected through the geared hub to a drive shaft (not shown). Drive assembly 26 is operatively connected to a pair of wheels 28 at the front or back of cycling apparatus 20 depending on whether drive assembly 26 is front wheel drive or rear wheel drive.

FIGS. 1 and 3 depict a front wheel drive embodiment of cycling apparatus 20. In this embodiment, drive assembly 26 is operably interconnected with a drive shaft (not shown) disposed in front axle 37 of front frame section 34 extending between wheels 28. FIG. 4 depicts one embodiment of a rear wheel drive assembly 26. It is contemplated that rear wheel drive assembly is substantially the same as front wheel drive assembly except that drive assembly 26 has been reversed and chain 56 extends toward the back of cycling apparatus 20. It is contemplated that the rear wheel drive assembly 26 may comprise one chain extending from chain ring 54 to rear axle 36 or, like the embodiment illustrated in FIG. 4, comprise two chains 56, 58 and an additional sprocket 60. Front wheel drive or rear wheel drive assembly are equally effective in carrying out the intended function of drive assembly 26.

According to another aspect of the present invention, cycling apparatus 20 also comprises a steering means for turning at least one of the wheels attached to frame structure 22. Structure capable of performing the function of such a steering means for turning at least one of the wheels attached to frame structure 22, as shown by way of example and not limitation in FIG. 1 comprises control apparatus 24.

One embodiment of control assembly 24 depicted in FIG. 1 comprises brake handles 62 and steering mechanism 64. Conventional brake systems are used on cycling apparatus 20 and have brakes on front and/or back wheels 28. Various embodiments of conventional steering mechanisms 64 may be utilized with cycling apparatus 20 with equal effectiveness. One embodiment of a conventional steering mechanism 64 is depicted in FIG. 1. Steering mechanism 64 includes a steering handle 66 operatively connected to a conventional tie-bar system for controlling the direction of wheels 28 at the front of cycling apparatus 20.

Gear selection is provided by gear shift mechanism (not shown) that can be mounted to control assembly 24 and operably interconnected to drive assembly 26. Pedal-operated cycling apparatus 20 is equipped with a steering mechanism that is easy and convenient for the cyclist to operate while seated in the recumbent position. Many suitable steering mechanisms are known. While FIG. 1 illustrates control assembly 24 that utilizes an upright steering mechanism 64, it is contemplated that steering mechanism could instead be a steering lever or bar positioned below back frame section 30 under seat 42. The rider would extend his or her arms downward to steer cycling apparatus 20. Lever systems utilized under the recumbent seats are well known. Similarly, the steering mechanism could instead be a joystick-like mechanism attached to central frame element 32. The joystick has the advantage that either person could be the driver. In addition, the riders can take turns steering without having to stop and trade seats.

Drive assembly 26, gearing mechanisms, and braking systems for cycling apparatus 20 are available ranging from the very simple to the very sophisticated. Drive assembly 26 preferably offers a wide range of gear ratios for ease of operation in varied terrain and circumstances. Suitable systems, by way of example and not limitation include those manufactured, by Shimano, Inc. of Osaka, Japan and Shimano American Corp., Irvine, Calif., and include NEXUS hubs Model Nos. SG-7C21 (having 7 gears and a coaster brake system), SG-7R40 (having 7 gears and a free-wheeling brake system with add-on rotary drum brake components), and SG4C30. Many other types of systems are available from other manufacturers and perform the function thereof with equal effectiveness.

As previously stated, drive assembly 26 includes a pedal assembly 49 a having crank arm 51 and pedals 50. Crank arms 51 are rotatably attached to chain ring 54 mounted on central frame element 32. Pedals 50 are connected to crank arm 51 and are supported by pedal support 52. Pedal support 52 is attached to central frame element 32. It is contemplated that various other embodiments of pedal assembly 49 can be used. For example, instead of being attached to central frame element 32, the pedal supports could be attached to front axle 37 of front frame section 34 and extend toward the back of cycling apparatus 20. The crank arms are attached to the remote end of the pedal supports and the pedals are mounted thereon. The pedals and crank arms are operably interconnected to the gear mechanism.

Pedal-operated cycling apparatus 20 is stable and easily pedaled, braked, and steered by a single cyclist. Cycling apparatus 20 preferably has a small turning radius to provide maneuverability in tight turn situations such as sidewalk corners. The wheels preferably will not leave the ground in a turn of 90 degrees and a radius of 15 feet while traveling at 10 mph. Cycling apparatus 20 is preferably a low maintenance apparatus and utilizes high-quality chains that need lubrication only once every 100 miles and high-quality brake components that require maintenance about every 500 miles.

It will be appreciated that other advantageous features could also be incorporated into the present invention. For example, if desired, the pedal-operated cycling apparatus could be made with detachable parts, e.g., wheels and seats, and a collapsible or otherwise disassemblable frame such that the cycling apparatus could be made compact for carrying and storing. A canopy or surrounding enclosure for sun and/or rain protection could also be provided to protect the seated cyclists only or to protect the entire apparatus. It will be appreciated that a motor could also be added to the design as either the primary or a back-up means of operation.

Cycling apparatus 20 is easy to mount and operate and permits two persons to sit in a comfortable recumbent position in a side-by-side manner in close proximity to one another while cycling. In addition, cycling apparatus 20 is easy and comfortable to pedal and to steer from the recumbent position. Pedal-operated cycling apparatus 20 is also stably balanced on three or, preferably, four wheels and can be safely and easily operated by one person or two persons. In addition, the pedal-operated cycling apparatus 20 is designed to be easily steered and highly maneuverable and capable of safe performance in varied conditions.

The innovative design of frame structure 22 of cycling apparatus 20 improves the comfort of the rider by absorbing and reducing the forces transmitted to the rider, thereby reducing the fatigue of the rider. Cycling apparatus 20 is also preferably made of lightweight materials to further minimize the cyclist fatigue during use and to permit easy portability.

It is a feature of pedal-operated cycling apparatus 26 that in one embodiment central frame element 32 is oriented in a centered vertical plane and the other components, e.g., the seats and wheels, are suspended outwardly and to the sides of this central vertical plane. Thus, the seats and wheels are not in the same vertical plane as the frame as on a traditional bicycle or a tandem bicycle. There are several advantages to this design. One advantage is that a person is able to sit upon the apparatus without having to step or climb over or otherwise straddle any portion of the frame element. In other words, a person just steps up to the seat and sits down. Another advantage of this feature is that the cyclists are permitted to sit in a comfortable recumbent position rather than in an upright and potentially precariously-balanced position.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced with their scope.

What is claimed and desired to be secured by United States Letters Patent is:

1. A recumbent cycling apparatus, comprising:
  (a) a plurality of wheels;
  (b) a frame structure mounted on said plurality of wheels, said frame structure comprising:
    (i) a front frame section having a front axle;
    (ii) a back frame section having a onepiece rear axle;
    (iii) a central frame element configured to flex about its longitudinal axis, said central frame element being substantially upwardly sloped from the front of said frame structure toward the rear of said frame structure, said central frame element being attached to said back frame section and said front frame section and extending therebetween such that the ability of said central frame element to flex about its longitudinal axis in response to a force acting on any of said plurality of wheels is substantially unrestricted, thereby allowing said central frame element to act as a shock absorber; and (c) a recumbent seat mounted on said back frame structure at a location remote from said rear axle, said recombent seat comprises a seat portion and a back portion, said recumbent seat being mounted to said back frame structure such that said seat portion is below a portion of said central frame element proximate to said seat portion;

(e) steering means for turning at least one of said plurality of wheels; and (f) drive moans for powering the cycling apparatus.

2. A cycling apparatus as recited in claim 1, wherein said central frame element is neither parallel nor coplanar with either said front axle nor said rear axle.

3. A cycling apparatus as recited in claim 1, wherein said central frame element is substantially disposed above said front axle and said rear axle.

4. A cycling apparatus as recited in claim 1, wherein said central frame element is substantially composed of a material selected from a group comprising chromoly steel, aluminum, titanium, and graphite.

5. A cycling apparatus as recited in claim 1, wherein said central frame element is substantially planar.

6. A cycling apparatus as recited in claim 1, wherein at least one of said front frame section and said back frame section is substantially composed of a material selected from a group comprising chromoly steel, aluminum, titanium, and graphite.

7. A cycling apparatus as recited in claim 1, wherein said central frame element is disposed in a plane substantially perpendicular to said front axle and said rear axle.

8. A recumbent cycling apparatus as recited in claim 1, wherein said front frame section, said back frame section, and said elongated central frame element are connected so as to allow said front frame section and said back frame section to move vertically, laterally, and to rotate about the longitudinal axis of said frame structure independently of the other thereby absorbing and reducing any forces transmitted to a user.

9. A recumbent cycling apparatus as recited in claim 1, wherein said elongated central frame element is sufficiently flexible to absorb and reduce any forces being transmitted to a user.

10. A recumbent cycling apparatus, as recited in claim 1, wherein said central frame element has a forward end and a rearward end, said rearward end of said central frame element being substantially hook-shaped.

11. A recumbent cycling apparatus as recited in claim 1, wherein said central frame element spans substantially the entire length of said frame structure.

12. A recumbent cycling apparatus as recited in claim 1, wherein said central frame element spans at least between said front axle and said rear axle.

13. A recumbent cycling apparatus, comprising:
(a) at least four wheels;
(b) a frame structure mounted on said wheels, said frame structure comprising:
 (i) a front frame section having a front axle;
 (ii) a back frame section having a one-piece rear axle;
 (iii) a tubular central frame element configured to flex about its longitudinal axis, said central frame element being substantially upwardly sloped from the front of said frame structure toward the rear of said frame structure, said central frame element being attached to said back frame section and said front frame section and extending therebetween such that the ability of said central frame element to flex about its longitudinal axis in response to a force acting on any of said plurality of wheels is substantially unrestricted, thereby allowing said central frame element to act as a shock absorber; and (c) a recumbent seat mounted on said back frame structure at a location remote from said rear axle, said recumbent seat comprises a seat portion and a back portion, said recumbent seat being mounted to said frame structure such that said seat portion is below a portion of said central frame element proximate to said seat portion;

(e) steering means for turning at least of one said plurality of wheels; and (f) drive means for powering the cycling apparatus.

14. A cycling apparatus as recited in claim 13, wherein at least one of said front frame section and said back frame section is substantially comprised of a material selected from a group comprising chromoly steel, aluminum, titanium, and graphite.

15. A cycling apparatus as recited in claim 13, wherein said central frame element is substantially composed of a material selected from a group comprising chromoly steel, aluminum, titanium and graphite.

16. A cycling apparatus as recited in claim 13, wherein said drive means comprises a drive assembly operably interconnected to at least one of said wheels rotatably attached to said front frame section.

17. A cycling apparatus as recited in claim 16, wherein said drive means is mounted on said front frame section rearward of said front axle.

18. A cycling apparatus as recited in claim 13, wherein said drive means comprises a drive assembly operably connected to at least one of said wheels rotatably attached to said back frame section.

19. A cycling apparatus, as recited in claim 13, wherein said central frame element is in a plane that is substantially perpendicular to at least one of said front frame section and said back frame section.

20. A cycling apparatus as recited in claim 19, wherein said central frame element is disposed in a vertical plane substantially perpendicular to at least one of said back frame section and said front frame section.

21. A cycling apparatus as recited in claim 13, wherein said front frame section and said back frame section are substantially composed of a material selective from a group comprising chromoly steel, aluminum, titanium, and graphite.

22. A frame as recited in claim 13, wherein said central frame element is substantially composed of chromoly steel.

23. A frame as recited in claim 13, wherein at least one of said front frame section and said back frame section are substantially parallel to the ground.

24. A frame for a cycling apparatus, comprising:
(a) a front frame section;
(b) a back frame section; and
(c) a tubular elongated central frame element configured to flex about its longitudinal axis, said central frame element being substantially upwardly sloped from said front frame section toward said rear frame section, said central frame element being configured such that upon a recumbent seat comprising a seat portion and a back portion being mounted to the frame, said seat portion is located below a portion of said central frame element proximate to said seat portion, said central frame element being attached to said back frame section and said front frame section and extending therebetween such that the ability of said central frame element to flex about its longitudinal axis in response to a force acting thereon is substantially unrestricted, thereby allowing said central frame element to act as a shock absorber.

25. A frame as recited in claim 24, wherein at least one of said front frame section and said back frame section are substantially composed of chromoly steel.

26. A frame as recited in claim 24, wherein said central frame element extends between the front-most end of said front frame section and the rear-most end of said back frame section.

27. A frame as recited in claim 22, wherein said central frame element is hook-shaped.

28. A frame for a cycling apparatus as recited in claim 22, wherein said central frame element has a forward end and a rearward end, said rearward end of said central frame element being substantially hook-shaped.

* * * * *

UNITED STATES PATENT AND TRADEMARK OFFICE
CERTIFICATE OF CORRECTION

PATENT NO. : 6,247,714 B1
DATED : June 19, 2001
INVENTOR(S) : C. Martin Rasmussen et al.

It is certified that error appears in the above-identified patent and that said Letters Patent is hereby corrected as shown below:

Column 2,
Line 44, before "be able" delete "must"

Column 5,
Line 13, after "style" change "peda-powered" to -- pedal-powered --
Line 35, after "the" change "fronft" to -- front --

Column 9,
Line 40, after "and" change "SG4C30" to -- SG-4C30 --
Line 44, after "assembly 49" change "a having" to -- having a --
Line 61, before "The wheels" change "comers" to -- corners --

Column 10,
Line 49, after "only as" change "illustrated" to -- illustrative --
Line 61, after "having a" change "onepiece" to -- one piece --

Column 11,
Line 14, before "steering" change "(e)" to -- (d) --
Line 16, before "drive" change "(f)" to -- (e) --
Line 16, before "drive" change "moans" to -- means --
Line 46, after "claim" change "1" to -- 8 --

Column 12,
Line 17, before "steering" change "(e)" to -- (d) --
Line 17, after "least" change "of one" to -- one of --
Line 19, before "drive" change "(f)" to -- (e) --
Lines 54 and 56, after "claim" change "13" to -- 24 --

Column 14,
Line 5, after "claim" change "22" to -- 24 --

UNITED STATES PATENT AND TRADEMARK OFFICE
CERTIFICATE OF CORRECTION

PATENT NO. : 6,247,714 B1
DATED : June 19, 2001
INVENTOR(S) : C. Martin Rasmussen et al.

It is certified that error appears in the above-identified patent and that said Letters Patent is hereby corrected as shown below:

<u>Column 14 (cont'd),</u>
Line 7, after "claim" change "22" to -- 27 --

Signed and Sealed this

Twentieth Day of April, 2004

JON W. DUDAS
*Acting Director of the United States Patent and Trademark Office*